United States Patent

[11] 3,533,401

[72] Inventor Benno Streu
Freiburg im Breisgau, Germany
[21] Appl. No. 656,463
[22] Filed July 27, 1967
[45] Patented Oct. 13, 1970
[73] Assignee Fritz Hellige & Co., G.m.b.H.
Freiburg im Breisgau, Germany
[32] Priority July 29, 1966
[33] Germany
[31] H 60,106

[54] APPARATUS FOR AUTOMATICALLY MEASURING BLOOD PRESSURE
1 Claim, 3 Drawing Figs.

[52] U.S. Cl. ......................................................... 128/2.05
[51] Int. Cl. ......................................................... A61b 5/02
[50] Field of Search ............................................. 128/2.05

[56] References Cited
UNITED STATES PATENTS

| | | | |
|---|---|---|---|
| 2,827,040 | 3/1958 | Gilford | 128/2.05 |
| 3,126,886 | 3/1964 | Karsh | 128/2.05 |
| 3,318,303 | 5/1967 | Hammacher | 128/2.05 |
| 3,319,623 | 5/1967 | London | 128/2.05 |
| 3,348,534 | 10/1967 | Marx et al. | 128/2.05 |
| 3,349,763 | 10/1967 | Clements et al. | 128/2.05 |
| 3,405,707 | 10/1968 | Edwards | 128/2.05 |

Primary Examiner—Anton O. Oechsle
Attorneys—Alan C. Rose, Robert H. Lentz, Alfred B. Levine, Richard Zentner and John Stan ABSTRACT: This invention relates to apparatus for measuring and indicating blood pressure by automatically determining the diastolic and systolic values of the blood pressure by using the characteristics of the so-called Korotkoff noise. The intensity of the Korotkoff noise varies with the patient and with the physical condition of the patient. Therefore, the maximum amplitude of the Korotkoff noise and the determination of the value of the corresponding diastolic noise level will vary according to these same two conditions. However, in general, the ratio of the diastolic pressure to the maximum amplitude of the Korotkoff noise will not vary as much, with respect to the two cited conditions. This invention relates to an improvement wherein the maximum Korotkoff noise level is, in effect, normalized, and therefore, taking into account the variations between particular patients or due to his physical condition at any particular time. The improvement includes triggering circuitry which enables the systolic and diastolic values to be automatically recorded as well as circuitry for automatically adjusting the sensitivity to the Korotkoff noise level or for choosing the proper amplification factor for the Korotkoff noise level.

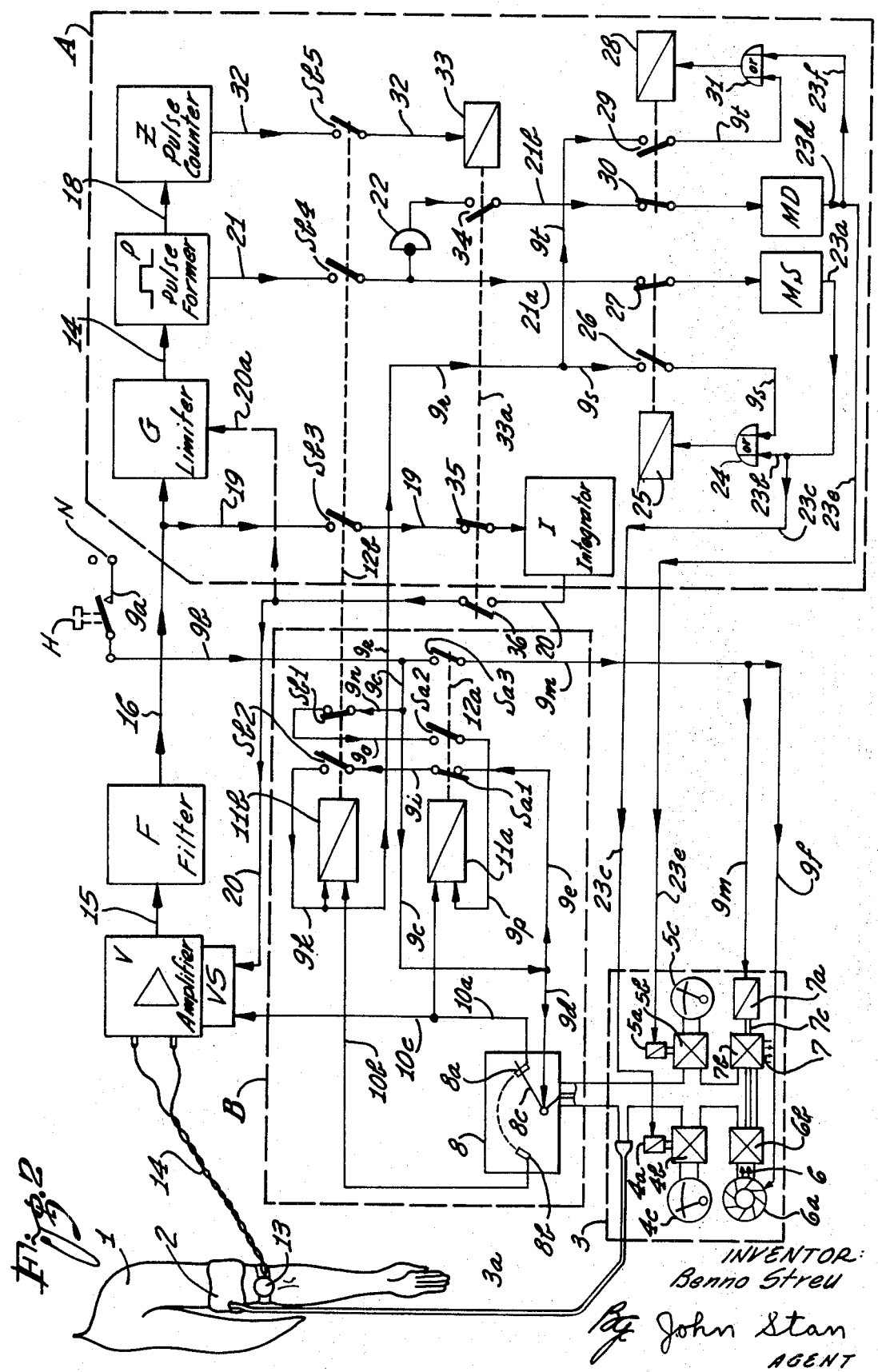

APPARATUS FOR AUTOMATICALLY MEASURING BLOOD PRESSURE

BACKGROUND OF THE INVENTION

This invention relates to apparatus for measuring and indicating blood pressure by automatically determining the diastolic and systolic values of the blood pressure by using the characteristics of the so-called Korotkoff noise. This painless procedure for determining the diastolic and systolic values of blood pressure uses, as is well known, the fact that noise signals are produced in the artery of an extremity of the body, and particularly of the upper arm, if this artery is compressed by means of a sleeve or cuff about the arm. This noise, the so-called Korotkoff noise, occurs during the interval of the pressure produced at the sleeve. The upper limit of this pressure corresponds to the systolic value and the lower limit of this pressure corresponds to the diastolic value of the artery pressure. The causes of this phenomenon of Korotkoff noise are fully known, and therefore they need not be discussed here in a more detailed manner.

Today blood pressure measuring devices are on the market, working in an extensively automatic manner, which execute such a measuring cycle, including the systolic and diastolic values, once or repeatedly several times, and which indicate the systolic and diastolic pressure values in an automatic manner or indicate these values at two correlated pressure gauges which record them in any convenient manner.

As is well known in the prior art, the significant pressure values, designated S and D for the systolic and diastolic pressures, respectively, as far as they are important for medical and diagnostic purposes, are not determined as similar points on the Korotkoff noise curve, nor do they have the same sound threshold level of noise intensity. While, with regard to the systolic pressure S, the very first and soft appearance of Korotkoff noises is significant it must be considered that, in accordance with medically determined criteria, the diastolic pressure value does not correspond to the value on the pressure curve corresponding to the point of disappearance of the Korotkoff noise, but rather to a pressure value somewhat greater than this. At this pressure value, the Korotkoff noise, after having run through an extended pressure range of whistling noises with strong, sharp sounds, become soft, dull noises, thus corresponding to a noise level which starts to decrease.

As a result of the foregoing discussion, it may be seen that of the pressure values for systolic and diastolic pressure determined by automatic blood pressure measuring devices of the prior art, the values determined for blood pressure supply correct information only with respect to the systolic pressure. While such prior art approaches are fairly accurate with respect to determining systolic pressure, indicated by the first appearance of the Korotkoff noise, they are inaccurate in the determination of the diastolic pressure, indicated by the inception of the decrease and a change in the character of the Korotkoff noise. Prior art devices have indicated diastolic pressure at the same sound threshold as that employed to determine systolic pressure.

Therefore, if both of these significant values, that is, the value of the diastolic pressure and the value of the systolic pressure, are to be indicated automatically and accurately, provisions had to be made that this essential difference is considered. If not, the diastolic value automatically indicated is not comparable with the value found by the physician by direct hearing by means of a normal stethoscope.

SUMMARY OF THE INVENTION

This invention resulted from the observation that the pressure values corresponding to the systolic and diastolic states, respectively, being medically and diagnostically significant, are not defined precisely by corresponding Korotkoff noise pulses nor by corresponding noise intensity.

Now, since the intensity of sound of the acoustic phenomenon differs much with different patients, a sensitivity control device must be inserted into the signal transfer line of the instruments used for conducting the electric Korotkoff noise pulses. With the aid of this control device, the sensitive position of the amplifier can be adapted to the especial dynamic conditions or volume of the Korotkoff noise of the treated patient, before the measuring procedure. If the blood pressures of several patients have to be examined by means of such an apparatus, therefore, a constant visual or acoustic control by an attendant or nurse is required, in order that the relatively sensitive position for the diastolic value of the Korotkoff noise may be properly adjusted at the sensitivity control device, if changes in the diastolic values from one patient to another patient are occurring.

Therefore, it is one object of this invention to eliminate the requirement for such constant attention to the blood pressure measuring devices. This task is solved, as is explained hereinbelow and indicated in the claims in more details, by providing the blood pressure measuring instruments with an automatic control device for determining the sensitive position for the pressure value of the compressed arteries corresponding to the diastolic pressure interval.

BRIEF DESCRIPTION OF THE DRAWINGS

For a complete understanding of the invention, together with other objects and advantages thereof, reference may be had to the accompanying drawings, in which:

FIG. 1b is a graph showing the intensity of the picked up Korotkoff noise correlated with the momentary pressures of FIG. 1a; and FIG. 2 is a schematic and diagrammatic view of the composition and the circuitry of a functioning blood pressure measuring device of the present invention.

DESCRIPTION OF THE PREFERRED EMBODIMENTS

Figure 1A:
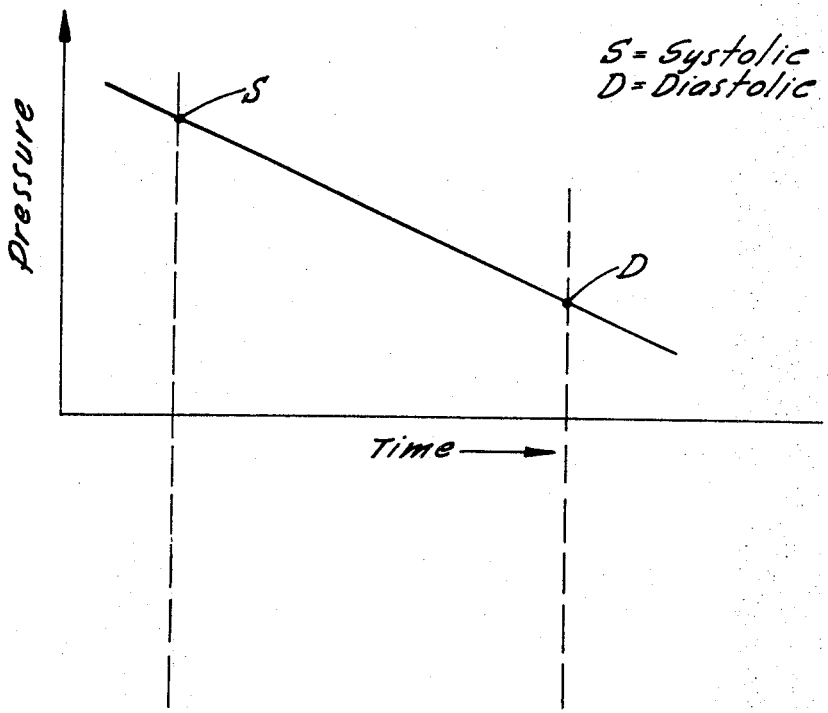
FIG. 1a shows a graphical representation of the time sequence of the pressure at the sleeve.

Referring now to FIG. 2, the essential elements of this type of blood pressure measuring device, also used in conventional embodiments, include an inflatable arm sleeve 2 which is applied to the upper arm portion 1 of the person whose blood pressure is to be measured. The sleeve 2 is connected to equipment, included in the dashed block labelled 3, for supplying and removing air through hose 3a, wherein the air-supplying equipment 6a may be a bellows, a reservoir of compressed air or other suitable source of air pressure.

Figure 1B:
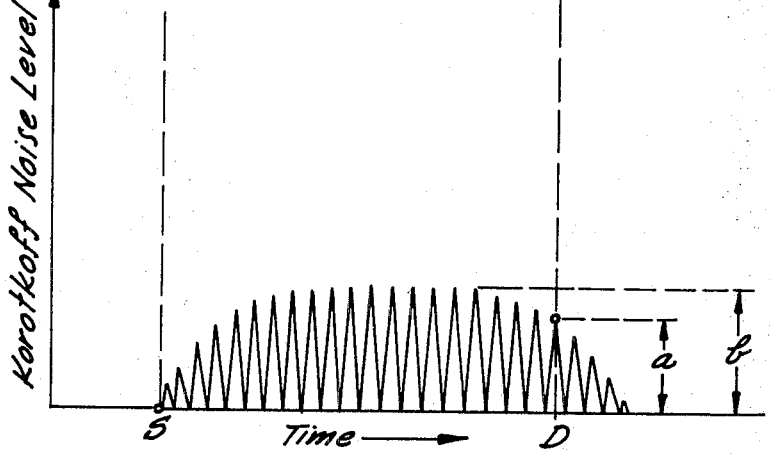

Referring now to FIGS. 1a and 1b, when such a device is put into operation, at first the sleeve 2 is inflated until a pressure greater than the systolic pressure value, designated S, is reached, after which the exhaust or bleeding valve 7b is opened, thus the pressure within the sleeve 2 being slowly reduced. By means of a microphone 13 put upon the artery somewhere below the sleeve 2, that is, distally away from sleeve 2, the pulse noise of the artery is picked up, and the pressure values S and D corresponding to the moments of starting and termination of the increasing and decreasing Korotkoff noise pulses are indicated at and read from a pressure gauge 4c or 5c, respectively, pneumatically connected to the sleeve.

A blood pressure measuring instrument, improved by the invention, comprises as essential parts a pressure system 6a for the inflatable sleeve 2, a controlling system B for the pressure cycle, a microphone 13, feeding, by means of twisted leads 14, amplifier V and frequency band filter F for amplifying and filtering the Korotkoff noise, and finally a discriminating system A for the systolic and diastolic blood pressures values.

By actuating a main power switch H, the electrical components of the instrument are connected to the main supply N and energized. The pressure cycle is instantly started at the same moment, the pressure system having a normal pressure at the beginning. The movable pointer 8c of the pressure gauge, or controlmanometer, 8 connected to the circuit line 9d and serving as a contact member, touches the contact 8a, herein called a minimum contact, directly connected with the compression relay 11a by lead 10a. Therefore, the pointer 8c completes the path of the power line, composed of the line 9a, main switch H, lines 9b, 9c, 9d, the pointer 8c, minimum contact 8a, line 10a and compression relay 11a. It should be pointed out that, in FIG. 2, only the "hot" or energizing leads of the relays are shown. Also, some relays such as relay 11a have two energizing leads, whereas other relays, such as relay 25 have only one energizing lead. The compression relay 11a being actuated, the movable arm of switch Sa1 coupled to the relay plunger 12a is opened, but the movable arms of switches Sa2 and Sa3, coupled to the same plunger 12a, are closed. Contact Sa3 then closes, or completes, the current line 9m for relay 7a connecting it to the power supply line 9b. Thus the normally-open compression valve 6b is opened and the normally open air exhaust valve 7b is closed.

Closing of relay contacts Sa3 also causes current line 9f, connected to the line 9m, to be connected to the power supply line 9b thus also causing the motor for the compressor 6a to start. During the compression phase thus being started, the pressure in the sleeve 2 will be increased to a point until a predetermined maximum value of pressure is reached at the pressure gauge 8 by means of the contact 8b, herein called a maximum contact. This pressure value should lie within safe limits near the value of the systolic blood pressure to be expected.

As has just been pointed out at the beginning of the cycle, energization of compression relay switch 11a also closes the switch contact Sa2. There will, therefore, be a complete circuit path consisting of lines 9b, 9c, 9n and including switch Sb1, line 9o, switch Sa2 and line 9p. Thus compression relay switch 11a is still energized even if the pointer contact 8c of the pressure gauge 8 has moved away from the minimum contact 8a. This is so because the exhausting relay switch 11b is not yet energized, and therefore the switch Sb1 is still closed.

As soon as the pointer 8c of the pressure gauge 8 has reached the maximum contact 8b, the exhausting relay switch 11b will be fed with current by the current lines 9b, 9c, 9d, pointer 8c, maximum contact 8b and line 10b, and therefore it will be energized and cause the switch Sb2 to close; whereas the switch Sb1 now will be opened, thus causing compression relay switch 11a to be deenergized. This also causes the compressor 6a to be turned off because switch Sa3 is opened, the compression valve 6b will be closed and the exhausting valve 7b opened by relay switch 7a.

When the exhausting phase is beginning, the pressure in the sleeve 2 is reduced slowly and as evenly as possible, corresponding to the adjustment of the valve 7b. Valve 7b is a solenoid-operated valve, whose opening is predetermined. The now closed switch Sb2 permits current to flow to the exhausting relay switch 11b, by the lines 9b, 9c, 9e, switch Sa1, line 9i, switch Sb2 and line 9k. The exhausting relay 11b will then be energized even if the pointer contact 8c of the pressure gauge 8 has moved away from the maximum contact 8b. For, under this condition, the compression relay switch 11a is now deenergized and therefore the switch Sa1 is closed.

The minimum contact 8a is so adjusted as to correspond to a pressure value lying within safe limits under the magnitude of diastolic blood pressure to be expected. If the pressure in the compression system begins to reach this value during the exhausting phase, the compression relay 11a will be energized again, whereas exhausting relay switch 11b will now be deenergized. The cycle of compression and exhausting will then repeat again.

For the discrimination of the Korotkoff noise pulses arising between the systolic and diastolic values of blood pressure and for picking up the sounds or noises produced in the artery or in the body, a microphone 13 is used which is put upon the artery of the upper arm below the sleeve 2 and which is connected to the input of the amplifier V by the flexible leads 14. The amplified noises are transferred by the line 15 to the frequency band filter F, through which can pass essentially frequencies of about 40 to 300 Hertz. In the output line 16 of this filter F, a pulse-forming stage, or pulse former, P is inserted. However, a limiting circuit, or limiter, G for adjusting the sensitive level for the signals may also be connected in series between the filter F and the pulse former P in order that only such Korotkoff noise pulses which surpass a certain defined intensity are used. By means of the Korotkoff noise pulses, transformed into pulses of certain form and certain length and with the aid of a pulse counting device, or pulse counter, Z connected to the pulse former P by the line 18, the systolic and diastolic values of blood pressure are determined.

With the device hereindescribed, discrimination of the Korotkoff noise pulses occurs during the exhausting phase, for which aim the necessary components are made to function with the energization of the exhausting relay 11b and the movement of the switch contacts Sb3, and Sb4 and Sb5 coupled to the plunger 12b of the exhausting relay 11b, to positions alternate to those shown in FIG. 2.

Referring now first to FIGS. 1a and 1b, if the decreasing pressure in the sleeve 2 produces a first systolic Korotkoff noise pulse, corresponding to the point S, then it will produce in the pulse former stage P a pulse, which will be fed by the line 21, the now closed contact Sb4, line 21a and the normally closed switch contact 27 to a suitable triggering circuit, for example to a first monostable multivibrator MS. This multivibrator MS furnishes at its output line 23a a pulse having a predetermined duration. The pulse, traveling from line 23a to line 23c, causes the relay switch 4a for valve 4b and gauge 4c to be energized for a short time, causing the valve 4b for the gauge 4c to be opened for this interval. The systolic value of blood pressure is recorded in the gauge 4c and kept recorded, since the valve 4b is immediately closed again.

In addition, what may be called a first assistant relay 25 will be actuated through lines 23a and 23b and the OR gate 24, thus interrupting the pulse-transferring line 21a by opening the movable arm of switch 27. Noise pulses in the artery during the decrease of the pressure between the systolic and the diastolic values at first will get even stronger, and then decrease, as may be seen from FIG. 1b, and the pulses produced by these noise pulses in the pulse former stage P, are no more able to actuate the triggering circuit MS, since the switch 27 is open.

The second input to the OR gate 24 is connected to the line 9k by the line 9s, closed switch 26, and lines 9s and 9r. Line 9k is fed with current only during the exhausting phase. Therefore, only during the exhausting phase and after the pressure in the sleeve 2 has dropped below the systolic pressure value S, will the first assistant relay 25 be energized and remain in this energized condition as soon as a first Korotkoff noise pulse has arrived.

In the prior art, there are some types of sphygmomanometers used for determining the systolic value of blood pressure which operate on principles similar to those just disclosed. In apparatus according to the invention hereindescribed, an additional feature, a pulse counting device Z, or pulse counter, serves to switch in the discrimination system A for the determination of the diastolic value of blood pressure as soon as a certain number—for example three—of Korotkoff pulses, predetermined and adjustable at the pulse counter Z, has arrived at the pulse counter Z after the blood pressure has dropped from a higher level to the systolic value.

The pulse counter Z then furnishes current to the relay switch 33 by the line 32 and the switch contact Sb5, which, as has been mentioned hereinabove, is closed during the exhausting phase. Thus, energizing the relay switch 33 causes the switch contacts of switch 34 to close. This connects a triggering device, for example a second monostable multivibrator MD, with the output of the pulse former P by line 21, switch Sb4, a negation gate or inverter 22, switch 34, line 21b and the normally-closed switch 30. The negation gate 22 furnishes a working pulse at its output only if no pulses are arriving at its input. This is the case, if—as will be shown hereinbelow—the amplitudes of the Korotkoff noise pulses, which are growing weaker at the diastolic level of blood pressure, decrease to a level below the predetermined sensitive, or threshold, level. The pulse then furnished at the output of the negation gate 22 triggers the monostable multivibrator MD, and causes at its output, at lead 23d, a current pulse of certain length and magnitude. This current pulse will actuate the relay switch 5a by means of the lines 23d and 23e, and which will therefore cause valve 5b to open during the period of this pulse, while at the gauge 5c the diastolic value of blood pressure is automatically indicated and retained.

The line 23d connected to the output of the monostable multivibrator MD is connected to line 23f, which is connected to a second OR gate 31. The output pulse of this OR gate 31 energizes a second assistant relay switch 28, which will cause the switch 30 in the input line 21b of the multivibrator MD to open, so that the latter receives no pulses of an amplitude below the predetermined threshold level. But, in order that relay switch 28 remain energized, the second input of the OR gate 31 is again connected to the current feeding line 9k, now fed with current during the exhausting phase, by the lines 9k, 9r, 9t and switch 29, now closed. It will be recalled that a similar situation existed with respect to the second input of the OR gate 24.

Therefore, relay switch 28 remains in its energized position during the remaining exhausting interval, after the diastolic value of blood pressure has been passed, that is, below the value designated a in FIG. 1b. Then the cycle reverses, which will be the case after the pressure has reached the minimum pressure value, corresponding to the predetermined setting at the minimum contact 8a of the control manometer, or pressure gauge 8.

The improvement according to this invention further comprises a device for the automatic controlling and adjusting of the degree of the amplification of the sensitive, or threshold, level for the Korotkoff noise. Therefore, the Korotkoff noise pulses, after being amplified in amplifier V and filtered in filter F, are transferred to the integrator I through the line 19 which, in turn, is connected to the output line 16 of the noise filter F. During the exhausting phase, the switches Sb3 and 35, connected in line 19, are closed until the systolic pressure value has been passed, that is, is below the value designated S in FIG. 1a.

In the integrator I, either the mean values, or the effective values, or the peak values of the Korotkoff noise pulses are integrated, and thereby what may be called an integrated magnitude is determined. This integrated magnitude determines a voltage or current magnitude and depends upon the amplitude and the number of arriving Korotkoff noise pulses in a given time interval. In order to get a well-defined integrated magnitude, the integrator I, after a certain predetermined number of defined Korotkoff pulses have arrived, is separated from the output of the amplifier V by a pulse from pulse counter Z, causing relay switch 33 to be energized, thereby opening switch 35. At the same time, a control signal corresponding to the value of the stored integrated magnitude will be transferred from integrator I to adjusting lever VS, of a potentiometer, for example, by line 20 or to adjusting limiter G by line 20a, owing to the fact that the switch 36, also actuated by relay switch 33, is closed. The adjusting lever VS may be used to adjust the degree of amplification or of the sensitivity of the amplifier V, but this has to be done in a reciprocal proportion to the value of the integrated magnitude and therefore to the individual dynamics or sound volume of the Korotkoff noises, which dynamics depend upon the physical state of, and the particular, test patient.

In another embodiment, the control signal corresponding to the value of the stored integrated magnitude adjusts the sensitive level for the pulse former P in the adjusting limiter G, again for example, by a potentiometer, in a sense proportional to the value of the determined integrated magnitude, that is, the greater the value of the integrated magnitude, the greater the threshold level must become. In other words: If the Korotkoff noise pulses are loud and strong at the pressure interval below the systolic value S, the amplification factor for the Korotkoff noise pulses has to be decreased, or the threshold level must be raised; and if the Korotkoff noise pulses are weak and low, the amplification factor has to be increased or the threshold level has to be lowered.

Consequently, this controlling circuit either measures the sound volume of the Korotkoff noise during a time interval determined by the counter Z, when the systolic pressure phase is passed, or this controlling circuit scans this sound volume, and according to the level of this sound volume, the sensitivity for the discrimination of the diastolic value of blood pressure is adjusted. Thus, no more pulses are formed in the pulse forming stage P, if, by a continual drop of the blood pressure, the diastolic phase has been reached and the amplitude of the Korotkoff noise has decreased to a certain fraction of the maximum value of the Korotkoff noise and of the sound volume of the initial noises, when the blood pressure has passed the systolic value of blood pressure. This fraction is characteristic for the diastolic value of blood pressure.

The sensitivity of the amplifier V, having been adjusted according to the value of the integrated magnitude, is now retained during the exhausting phase.

After the measuring cycle has ended, the amplifier V automatically returns to its normal sensitivity. This may be effected, for example, by coupling the adjusting lever VS or the adjusting limiter G to the minimum contact 8a of the controlling pressure gauge 8 by line 10c. This line is supplied with current, after the exhausting phase has ended, by lines 9b, 9c, 9d, pointer 8c and line 10a. It can then furnish a triggering pulse for restoring the original sensitivity of the adjusting lever VS or of the adjusting limiter G for the sensitivity level of the pulse former P (not shown), to their original, starting sensitivity.

By the improvements in automatic blood pressure gauges (sphygmomanometers) hereindescribed, therefore, they may be handled in a simple manner, and they are able to furnish diastolic values of blood pressure according to criteria unambiguously defined, so that measurements are comparable and reproducible. As has already been pointed out, the instrumentation gives an accurate reading, irrespective of the patient or his specific physical condition. This is important and advantageous in clinics and hospitals.

It is to be understood that the above-disclosed arrangements are illustrative of the application of the principles of the invention. Numerous other arrangements may be devised by those skilled in the art without departing from the spirit and scope of the invention, which is to be limited only by the appended claims.

I claim:

1. Apparatus for automatically measuring the systolic and diastolic value of blood pressure of a patient by use of the Korotkoff noise pulses, comprising:

compression means, including an inflatable sleeve attached to an extremity of a patient, and first and second pressure gauges to record the systolic and diastolic values of blood pressure, respectively, for inflating and deflating said sleeve;

a microphone adapted to be attached to said extremity for detecting the Korotkoff noise pulses generated therein;

amplifier means connected to the output of said microphone for amplifying said Korotkoff noise pulses;

filter means connected to the output of said amplifier means for passing said Korotkoff noise pulses;

limiter means connected to the output of said filter means for adjusting the sensitivity level of said Korotkoff noise pulses;

pulse forming means connected to the output of said limiter means for transforming said Korotkoff noise pulses into pulses of a predetermined form and a predetermined length, said pulse forming means having a first output and a second output;

sensitivity means connected to said first output of said pulse forming means and said output of said filter means for adjusting said amplifier means and said limiter means, said sensitivity means comprising:

a pulse counter connected to said first output of said pulse forming means for detecting a predetermined number of Korotkoff noise pulses subsequent to the recording of said systolic value;

integrator means connected to said output of said filter means for integrating said Korotkoff noise pulses;

switching means operating in response to said pulse counter for applying the output of said integrator means to one of said amplifier means and said limiter means; and actuating means connected between said second output of said pulse forming means and said first and second pressure gauges for ensuring the recording of said systolic and diastolic values of blood pressure.